M. ADENOT.
BRAKING MECHANISM FOR THE FRONT WHEELS OF MOTOR CARS.
APPLICATION FILED JULY 25, 1921.

1,437,080. Patented Nov. 28, 1922.

Witnesses

Inventor

Patented Nov. 28, 1922.

1,437,080

UNITED STATES PATENT OFFICE.

MARIUS ADENOT, OF CALUIRE, FRANCE, ASSIGNOR TO SOCIETE LYONNAISE D'INDUSTRIE MECANIQUE, OF CALUIRE, RHONE, FRANCE.

BRAKING MECHANISM FOR THE FRONT WHEELS OF MOTOR CARS.

Application filed July 25, 1921. Serial No. 487,291.

*To all whom it may concern:*

Be it known that I, MARIUS ADENOT, of Caluire, Rhone, France, a citizen of the French Republic, have invented certain new and useful Braking Mechanism for the Front Wheels of Motor Cars, of which the following is a specification.

The present invention has for its object a brake actuating device for the front wheels of motor cars. The device is mounted directly on the stub axle and does not comprise an universal joint it being governed by simple mechanical means comprising cables and a lever.

The invention is illustrated, in the accompanying drawings in which:—

Figure 1:
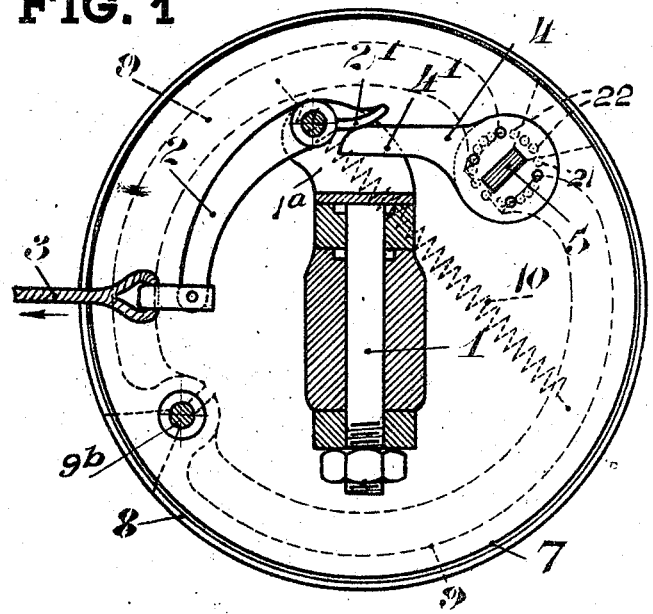
Figure 2:
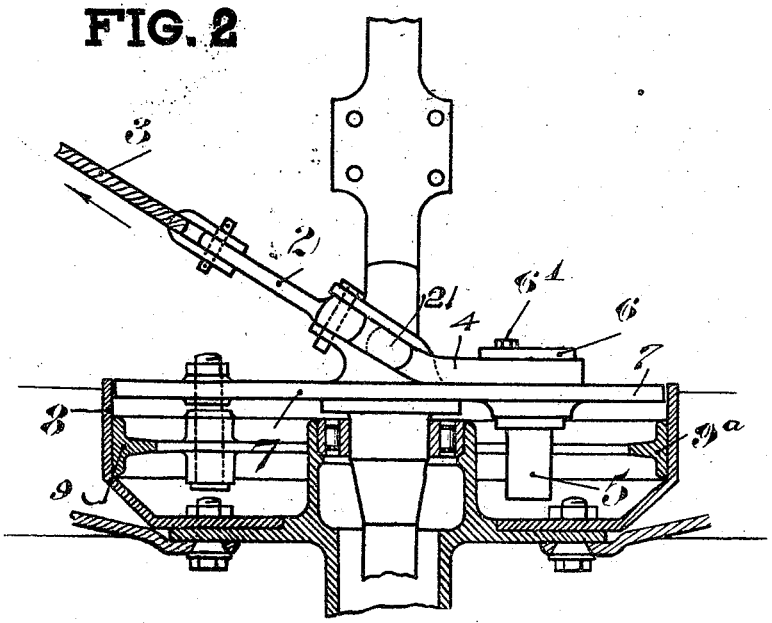

Fig. 1 is an elevation partly in section and Fig. 2 is a plan view.

The stub axle 1 comprises a cap $1^a$ in which is mounted a double lever 2 pivoted at $c$ and of which one arm $2^1$ is of spatulous shape. This lever, which is actuated by cable 3, bears on the end of a lever 4, the end $4^1$ of which is shaped so that the point of contact of the two levers is always on the axis of the stub axle 1.

The lever 4 is mounted on the actuating cam 5 of the brake jaws 9 $9^a$ pivoted at $9^b$ and is accessible for regulation by a plate 6 connected to the lever by a bolt $6^1$. The cam actuates the jaws against the tension of a spring 10 when the lever 4 is depressed by lever 2 $2^1$.

The cam is pivoted on a plate 7 arranged within the brake drum 8 and connected to the cap $1^a$ of the spindle.

The regulating plate 6 is provided with nine equidistant holes 21 and the corresponding plate of the lever 4 is provided with only eight similar holes 22. By causing one of the holes 22 to coincide with one of the holes 21 and by locking the lever 4 and the plate 6 in this position by means of a bolt the desired regulation is obtained. The displacements of the lever with respect to the plate is made through an angle of 5°, or 1/72 of a rotation each time, which is amply sufficient to allow for proper regulation when necessary.

When the front wheels of the car are turned for steering purposes, the lever 4 and the cam 5 turn with the wheel, whilst the double lever 2 remains immovable with the axle 1, which is pinned and bolted on the axle body.

What I claim as my invention and desire to secure by Letters Patent of the United States is:—

Braking mechanism for the front wheels of motor cars comprising a bearing cap mounted on the stub-axle of the car, a double lever pivotally mounted in said bearing cap one end of said lever being of spatulous shape, an operating cable attached to the other end of said lever, a plate, a drum surrounding said plate, brake jaws in said drum, a cam for actuating said jaws mounted on said plate, a second lever mounted on said cam the end of which lies under and in contact with the spatulous shaped end of said double lever the contact point of said lever being always in line with the axis of the stub axle, and means for adjusting said second lever with respect to said cam.

In witness whereof I have signed this specification in the presence of two witnesses.

MARIUS ADENOT.

Witnesses:
JULIAN SEMPLE SWEDBERG,
JEAN GERMAIN.